United States Patent
Case et al.

(10) Patent No.: US 11,187,122 B2
(45) Date of Patent: Nov. 30, 2021

(54) DIESEL PARTICULATE FILTER CLEANING MACHINE WITH FILTER CLEANING TIME PREDICTION

(71) Applicant: EcoClean Advantage, LLC, Sanford, FL (US)

(72) Inventors: Bryan J. Case, Mission Viejo, CA (US); Gregory J. Lukins, Sanford, FL (US); David L. Butler, Winter Park, FL (US)

(73) Assignee: EcoClean Advantage, LLC, Ankeny, IA (US)

( * ) Notice: Subject to any disclaimer, the term of this patent is extended or adjusted under 35 U.S.C. 154(b) by 676 days.

(21) Appl. No.: 15/806,774

(22) Filed: Nov. 8, 2017

(65) Prior Publication Data

US 2018/0128137 A1    May 10, 2018

Related U.S. Application Data

(60) Provisional application No. 62/418,903, filed on Nov. 8, 2016, provisional application No. 62/549,153, filed on Aug. 23, 2017.

(51) Int. Cl.

| | |
|---|---|
| *F01N 3/023* | (2006.01) |
| *B01D 41/04* | (2006.01) |
| *B01D 46/00* | (2006.01) |
| *G07C 5/08* | (2006.01) |
| *G07C 5/10* | (2006.01) |

(Continued)

(52) U.S. Cl.
CPC ......... *F01N 3/0237* (2013.01); *B01D 39/201* (2013.01); *B01D 41/04* (2013.01); *B01D 46/0086* (2013.01); *B08B 3/02* (2013.01); *B08B 3/026* (2013.01); *B08B 3/04* (2013.01); *B08B 3/08* (2013.01); *G07C 5/0808* (2013.01); *G07C 5/0816* (2013.01); *G07C 5/10* (2013.01); *B01D 2279/30* (2013.01); *B08B 2203/0223* (2013.01); *B08B 2203/0264* (2013.01); *G07C 2209/08* (2013.01)

(58) Field of Classification Search
CPC ...... G07C 5/0816; G07C 5/0808; G07C 5/10; G07C 2209/08; B01D 46/0086; B01D 41/04; B01D 39/201; B01D 2279/30; B08B 3/08; B08B 3/026; B08B 3/04; B08B 3/02; B08B 2203/0264; B08B 2203/0223; F01N 3/0237
See application file for complete search history.

(56) References Cited

U.S. PATENT DOCUMENTS

| | | |
|---|---|---|
| 5,048,139 A | 9/1991 | Matsumi |
| 5,172,572 A | 12/1992 | Ono |

(Continued)

*Primary Examiner* — Benjamin L Osterhout
(74) *Attorney, Agent, or Firm* — John L. DeAngelis; Wolter, Van Dyke, Davis, PLLC

(57) ABSTRACT

A diesel particulate filter cleaning machine. The filter is filed with a soaking solution comprising water and a surfactant and retained within the filter during a soaking interval. The filter is placed in a rinsing station after the soaking interval. A rinse water head positioned above an upper surface of the filter supplies rinse water into the filter, the rinse water passes through and drains from the filter. During the rinsing process, an actuator moves the rinse water head relative to the upper surface of the filter. A drain receives the rinse water after draining from the filter.

32 Claims, 10 Drawing Sheets

(51) Int. Cl.
  *B08B 3/08* (2006.01)
  *B08B 3/02* (2006.01)
  *B08B 3/04* (2006.01)
  *B01D 39/20* (2006.01)

(56) References Cited

U.S. PATENT DOCUMENTS

| | | | |
|---|---|---|---|
| 5,555,583 | A | 9/1996 | Berkcan |
| 5,560,060 | A | 10/1996 | Dausch |
| 5,603,233 | A | 2/1997 | Erickson |
| 6,276,374 | B1 | 8/2001 | Wilson |
| 7,025,811 | B2 * | 4/2006 | Streichsbier ........... B01D 41/04 |
| | | | 210/411 |
| 7,128,075 | B2 | 10/2006 | Publ |
| 7,146,991 | B2 | 12/2006 | Stockert |
| 7,582,141 | B2 | 9/2009 | Ehlers |
| 8,048,207 | B1 | 11/2011 | Streichsbier |
| 8,225,804 | B2 | 7/2012 | Publ |
| 8,241,403 | B2 | 8/2012 | Tadrous |
| 8,256,060 | B2 | 9/2012 | Wagner |
| 8,568,536 | B2 | 10/2013 | Meister |
| 2004/0103788 | A1 * | 6/2004 | Streichsbier ........... B01D 41/04 |
| | | | 95/279 |
| 2006/0201326 | A1 * | 9/2006 | Wagner .................. B01D 41/04 |
| | | | 95/280 |
| 2008/0083334 | A1 * | 4/2008 | Bardhan ................. F01N 3/023 |
| | | | 95/281 |
| 2008/0178413 | A1 * | 7/2008 | Wagner .................. B01D 41/04 |
| | | | 15/319 |
| 2009/0000479 | A1 * | 1/2009 | Streichsbier ....... B01D 46/2418 |
| | | | 95/279 |
| 2009/0056288 | A1 * | 3/2009 | Waldo ................... B01D 41/04 |
| | | | 55/294 |
| 2009/0277475 | A1 | 11/2009 | Goddard |
| 2010/0037423 | A1 * | 2/2010 | Herman ................. B01D 41/04 |
| | | | 15/406 |
| 2011/0146721 | A1 * | 6/2011 | Meister ................. F01N 3/0237 |
| | | | 134/22.1 |
| 2015/0239016 | A1 | 8/2015 | Spencer |
| 2017/0370257 | A1 * | 12/2017 | Ostrander ............. F01N 3/0233 |

\* cited by examiner

FIG. 6 FILTER CLEANING MACHINE CLEAN WATER TANK UPPER LEVEL SENSOR

FIG. 7 FILTER CLEANING MACHINE CLEAN WATER TANK LOWER LEVEL SENSOR

FILTER CLEANING MACHINE WATER SIDE VIEW

DIESEL PARTICULATE FILTER CLEANING MACHINE WITH FILTER CLEANING TIME PREDICTION

CROSS REFERENCE TO RELATED APPLICATIONS

The present application claims priority under 35 U.S.C. 119(e) to the provisional patent application filed on Nov. 8, 2016 and assigned application No. 62/418,903, and to the provisional patent application filed on Aug. 23, 2017 and assigned application No. 62/549,153. Both of these provisional patent applications are incorporated in their entirety herein.

BACKGROUND OF THE INVENTION

During operation, diesel trucks emit diesel particulate matter (DPM) that has been shown to be harmful to human health and air quality. Consequently, diesel particulate filters (DPFs) were introduced in the mid 2000's to keep DPM from entering the atmosphere as pollutants. DPFs are now required emissions equipment on all new diesel truck engines.

DPFs work by trapping diesel particulates and other by-products of combustion that are airborne in the engine exhaust gas. The DPF comprises a large number of parallel air channels separated by porous ceramic walls. Exhaust gas flows under pressure into the inlet air channels on an inlet side of the filter. The outlet side of each inlet air channel is blocked, preventing the air from exiting. The channels are arranged so that each inlet channel is surrounded by four outlet channels, which are blocked on the inlet side but open on the outlet side. This arrangement forces the exhaust gas in the inlet channel through the inlet channel's ceramic walls and into the adjacent outlet air channel.

The ceramic walls have microscopic pores that allow the gas to pass through, but airborne DPMs of 10 μm and larger are blocked. As a result, the DPM are trapped in the air channels as the engine is running. In a typical filter, the air channels are approximately 3/64" square and there are typically more than a thousand air channels in a filter.

During normal operation of a diesel engine, the accumulated DPM in the air channels is burned into soot and ash through a series of high temperature cycles known as regeneration cycles. But with time, the air channels become clogged with soot and ash, and exhaust gas can no longer pass through the ceramic walls. At this point the DPF must be removed and cleaned. If the DPF is not cleaned, harmful back pressure increases. Engine sensors detect this pressure increase and drastically limit engine power to prevent engine damage.

Fuel economy also begins to drop when the filter is only about half full of DPM. It is therefore important to clean the filter as a regular maintenance item. Cleaning is also more cost effective than replacing the filter because the filters are expensive.

The filter cleaning interval depends on the size of the engine and how the vehicle is driven. Over-the-road trucks that are driven a very high number of miles require annual filter cleanings. Urban delivery trucks, trash trucks, buses and other heavy vehicles, which frequently stop and start, need filter cleanings as often as quarterly.

The current industry standard method of cleaning filters forces high pressure air through the DPF, followed by a 1,100+° F. kiln baking cycle of about twelve hours duration. But this method has significant drawbacks as the cleaning cycle is long and may irreparably damage the filter. The cleaning air is compressible and thus its effectiveness is reduced. The process requires a full workday for the cleaning cycle because of the baking cycle. Not only is this a slow process, but the extended exposure to intense heat and stagnant air inside the kiln damages both the filter's internal structure and the adhesives holding the filter components together.

This prior art cleaning method also has a negative impact on profitably of a trucking business and furthermore poses a health risk to its employees. By law, a truck cannot be operated without a DPF installed. The truck must therefore be taken out of service during the cleaning process, resulting in a significant loss of income. Replacing the filter also costs thousands of dollars, and the kilning process accelerates the replacement cycle. OSHA workplace safety regulations also require strict and expensive personal protection devices for employees who perform DPF cleaning because of the carcinogenic and respiratory hazards of airborne ultra-fine DPM. DPM is also known as "carbon black," the same substance that causes black lung disease in coal miners. OSHA has published several Hazard Warnings and other notices warning of the dangers of "carbon black" exposure and the DPF cleaning techniques. Thus, the air/bake DPF cleaning technique has significant drawbacks.

Other methods of DPF cleaning force impulses of hot water through the filter using high pressure air. Although safer and faster than the air/bake method, this process also damages the internal structure of the filter and accelerates the need for expensive filter replacement. It also does not completely clean the filter due misalignment between the water flow and the air inlet and outlet channels.

BRIEF DESCRIPTION OF THE DRAWINGS

The present invention can be more easily understood and the advantages and uses thereof more readily apparent when the detailed description of the present invention is read in conjunction with the figures wherein.

In accordance with common practice, the various described features are not drawn to scale, but are drawn to emphasize specific features relevant to the invention. Like reference characters denote like elements throughout the figures and text.

DETAILED DESCRIPTION OF THE INVENTION

Overview of the Filter Cleaning Machine

Figure 1:
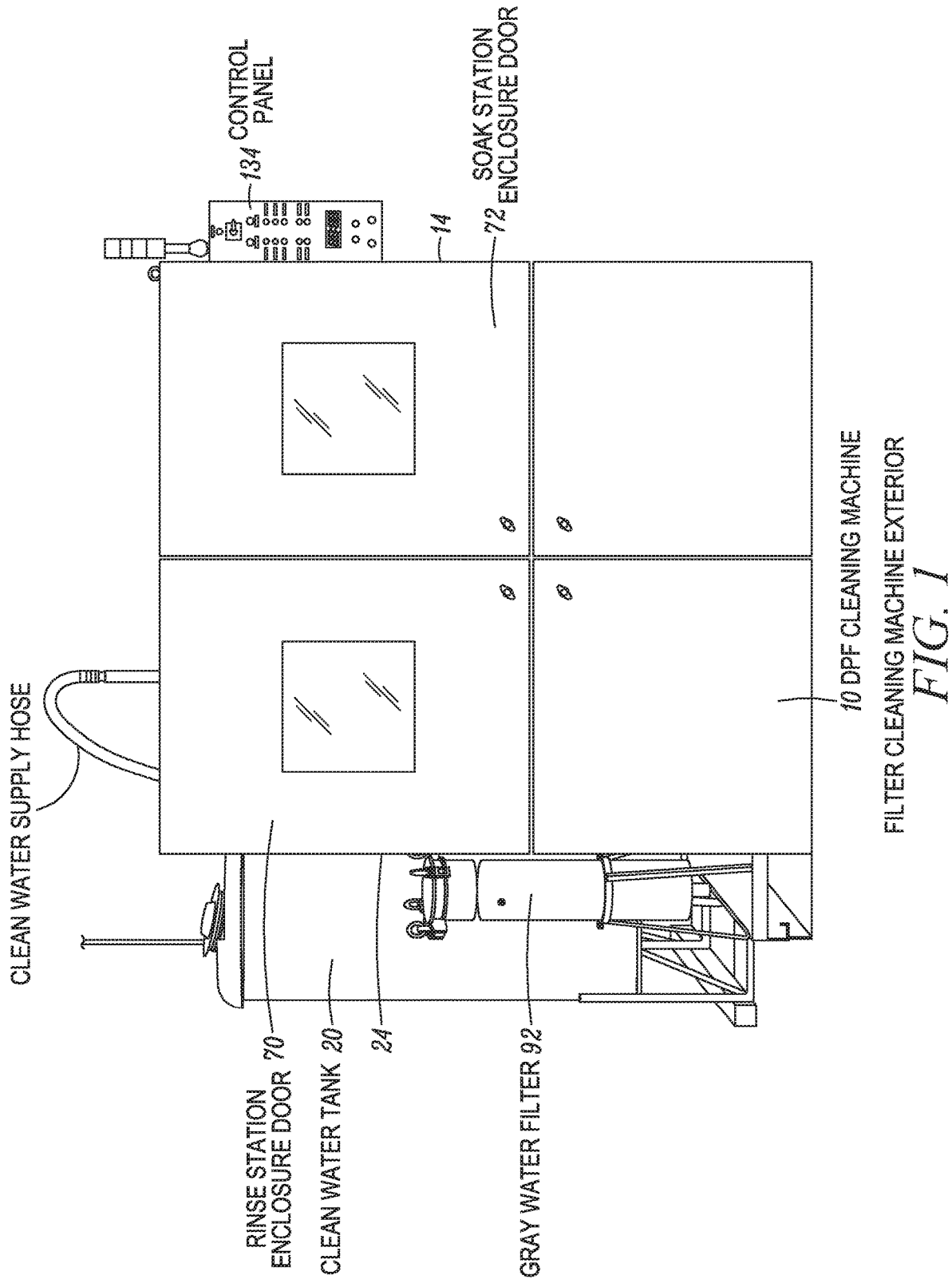
FIG. 1 illustrates an exterior view of the filter cleaning machine of the present invention.
Figure 2:
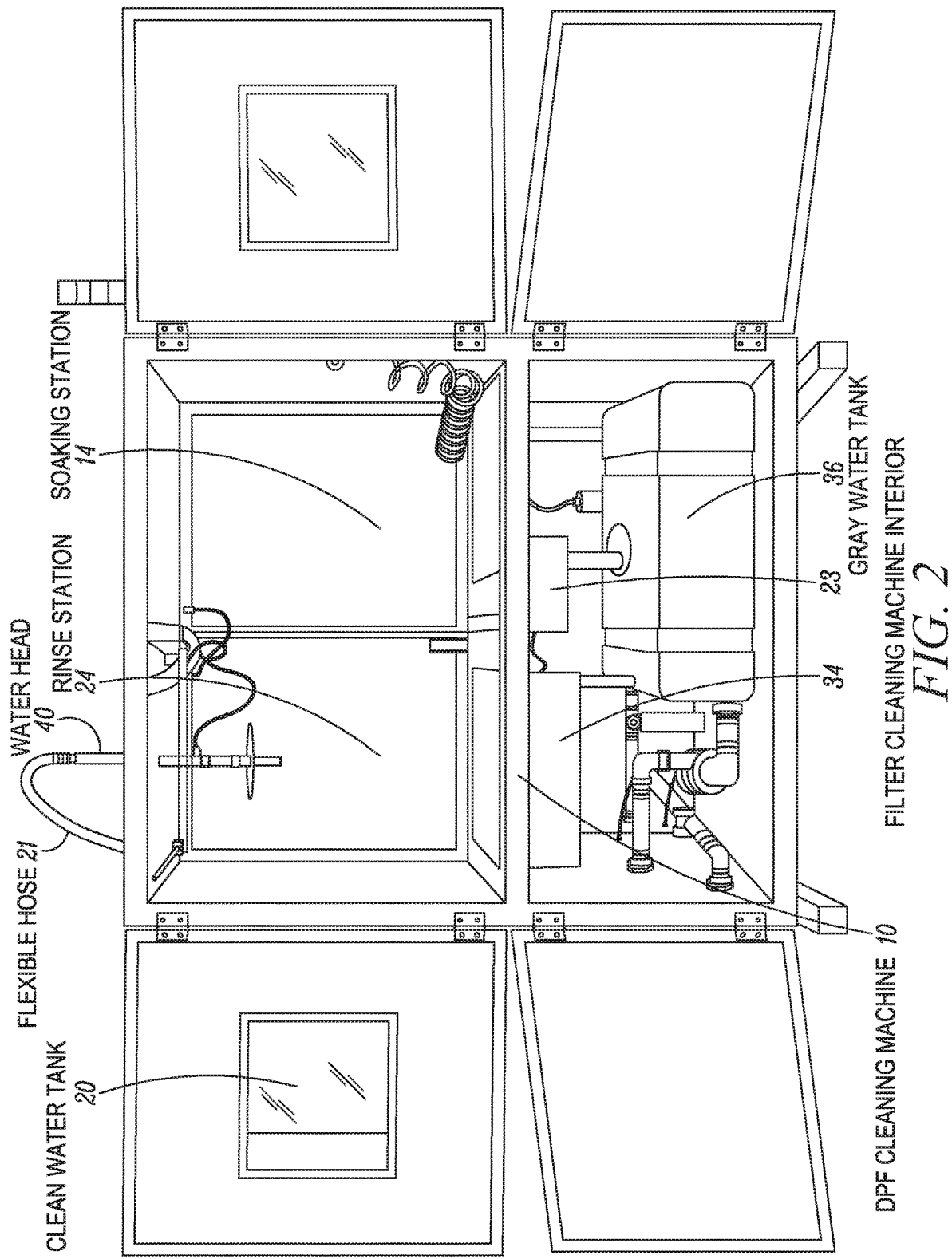
FIG. 2 illustrates an interior view of the filter cleaning machine of FIG. 1.
Figure 3:
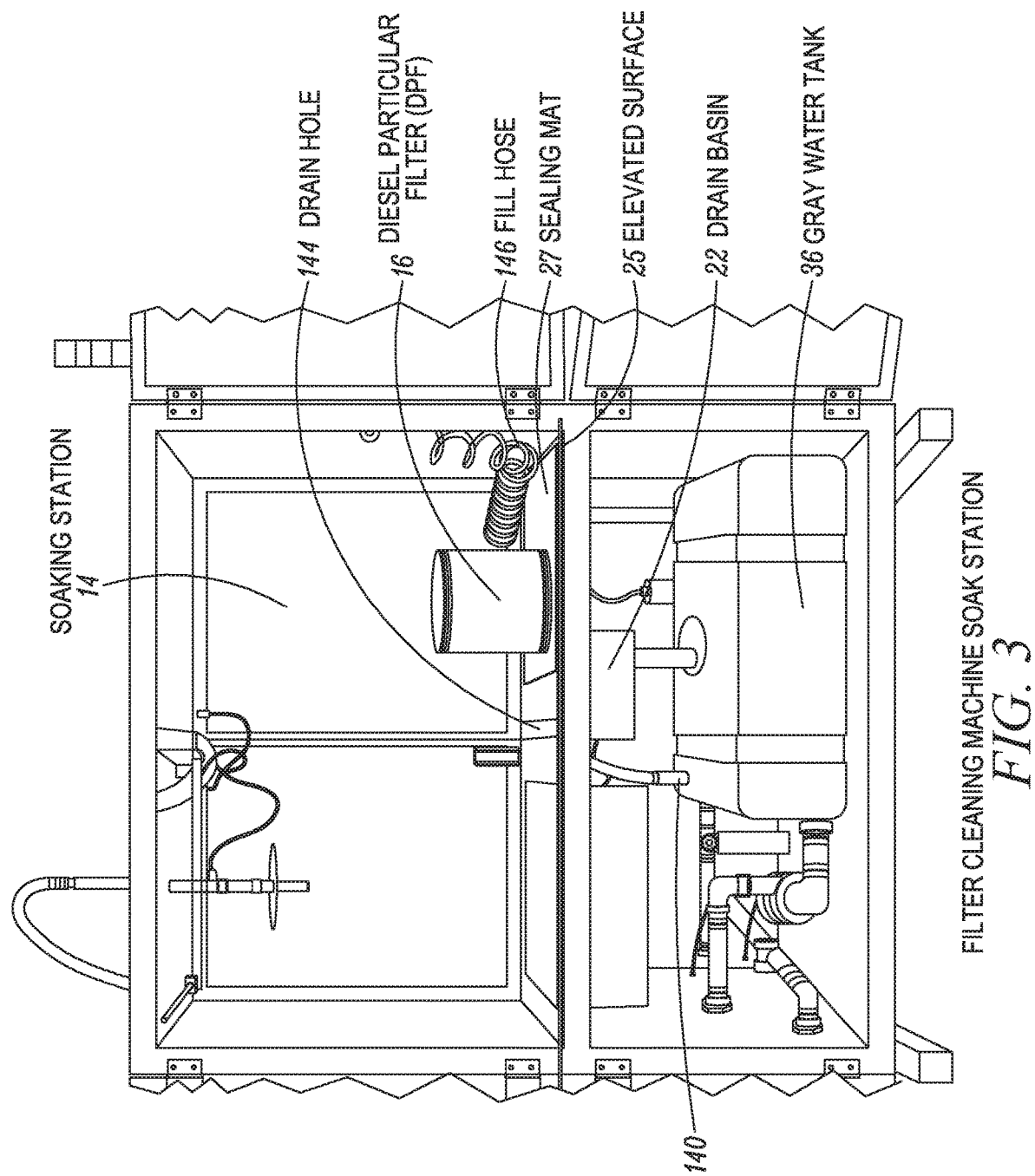
FIG. 3 illustrates a soak station of the filter cleaning machine of FIG. 1.
Figure 4:
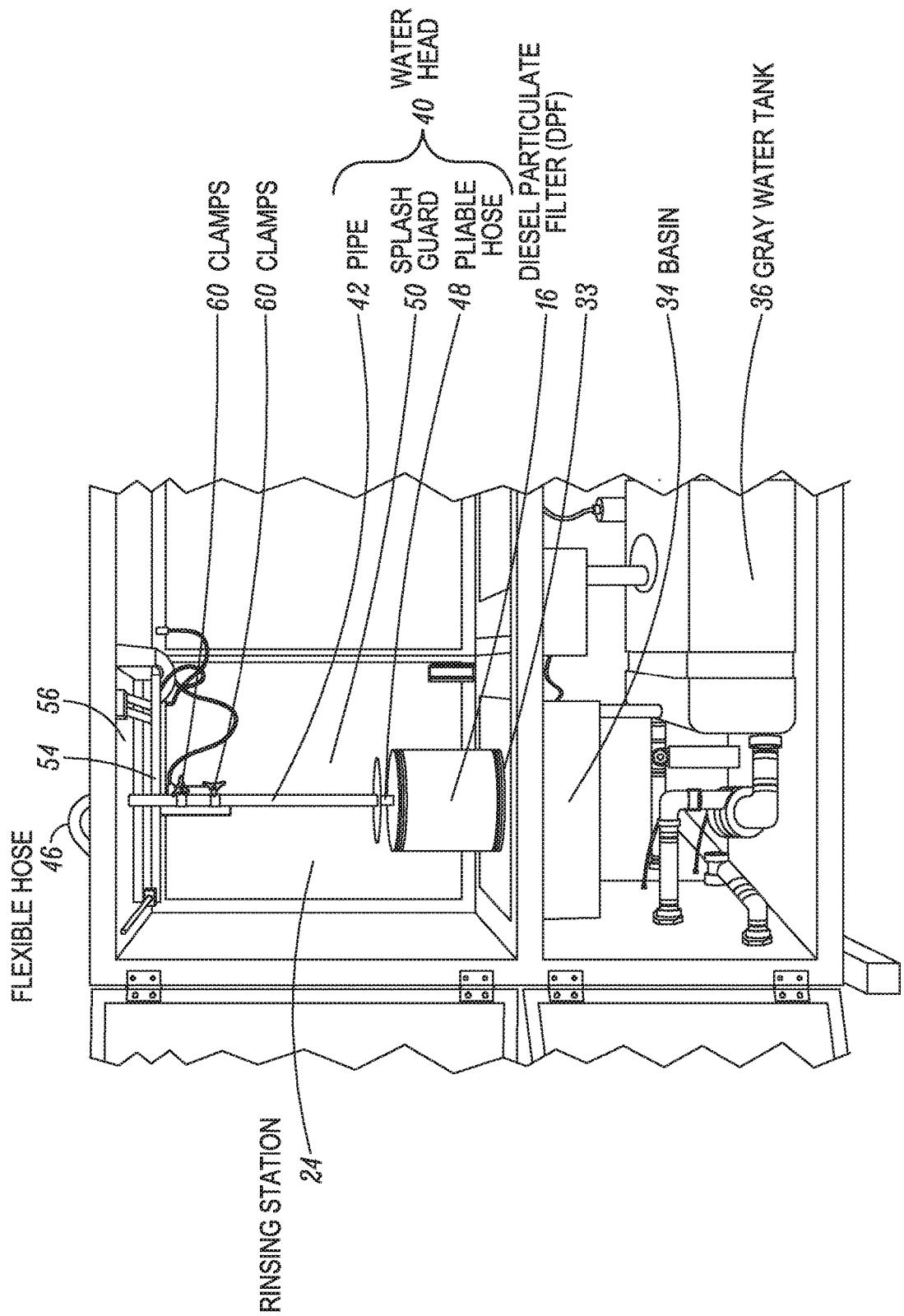
FIG. 4 illustrates a rinse station of the filter cleaning machine of FIG. 1.

The present invention uses water as its cleaning agent and traps and eliminates airborne DPM. The invention teaches an optimal method of cleaning the DPF: minimal cleaning time, maximum cleaning effectiveness, enhanced workplace safety, and minimal filter damage.

The DPF cleaning machine of the present invention is designed to remove accumulated soot and other contaminants from a variety of filter types. The machine is shown and operation described in the accompanying Figures.

A DPF cleaning machine 10 is illustrated in FIGS. 1-8 and comprises the following elements. The operation of each is explained below.

Soaking station 14 (see in particular FIGS. 2 and 3): A dirty filter 16 is placed within and soaked in the soaking station 14. This is the first stage in the cleaning process of the invention. Soaking station water is supplied from a clean water tank 20 via a flexible fill hose 146. A bottom surface of the soaking station 14 is elevated approximately ½" along one edge, thereby creating an elevated surface 25, to allow the dirty water to drain into a drain basin 23 through a drain hole 144. From the drain basin 23 the dirty water flows into a gray water tank 36. After the soaking step has been completed the operator rocks the DPF to drain the water from it. During the soaking process the filter rests upon a sealing mat 27.

A detergent suitable for degreasing, such as formulas including a glycol ether or alkyl aryl sulfonate, is added to the soaking station water for use during the soaking stage. The soak time is dependent upon both the dirtiness of the filter and the concentration of the detergent within the soaking solution. The detergent is also referred to as a surfactant herein.

To begin the soaking process, detergent solution is poured into the filter after the filter is placed in the soaking station 14. Only the internal structure of the filter needs to be cleaned; the outside surfaces of the filter retain the soaking solution within the filter.

Including the soaking step in the cleaning operation of the present invention places less reliance on the subsequent rinsing step (described below) to clean the filter and avoids the use of high-pressure water or air, as used by prior art filter cleaning techniques, during the rinsing step. This high-pressure stream of air or water can damage diesel filter components.

Rinsing station 24 (see in particular FIGS. 2, 4, and 8): After soaking, an operator slides the filter into a rinsing station 24. Since the wet filter is heavy, it is advantageous for the operator to slide the filter without having to lift it. This operation is easily accomplished by placing a floor surface of the rinsing station and the soaking station at the same height above ground.

The water in the rinsing station freely drains through one or more openings in a drain grate 33 in a bottom surface of the rinsing station 24 into a catch basin 34 and into the gray water tank 36.

Rinsing station water head 40 (see in particular FIGS. 4 and 8): While in the rinsing station 24, a constant supply of low pressure water flushes the loosened soot and contaminants as well as the remaining detergent from the filter. This water is pumped from the clean water tank 20 (see FIG. 1) and delivered through a rinse water head 40 positioned above the filter. Under control of a process or system controller, the rinse water head 40 moves over an upper surface of the filter to direct the rinse water into the filter and thereby rinse the entire filter.

The water head 40 comprises a pipe 42 (see FIGS. 4 and 8) (preferably made of metal and preferably aluminum) and greater than about 24 inches in length. One end of the pipe 42 is coupled via a flexible hose 46 to the low-pressure water supply in the clean water tank 20 and the other end is connected to a flexible or pliable hose 48, preferably vinyl and less than about 4 inches long. The circumferential ends of a top and bottom surface of a typical DPF are surrounded by short rim (not visible in the Figures), so the pliable hose 48 prevents the water head 40 from snagging on a rim of the filter as the head 40 is moved over the surface of the filter. Water is directed over both ends of the filter, as described below. A splash guard 50 is mounted at the intersection of the pipe 42 and the pliable hose 48 to block backsplash from the filter surface.

The water head 40 is affixed to controllable and motorized linear actuators that allow the water head to be precisely moved along the axes of the actuator. The linear actuator comprises an actuator 54 controllable to travel in a left-right direction relative to the filter. The actuator 54 is mounted perpendicular to an actuator 56 controllable to travel in a font-back direction, again relative to a position of the filter. This mounting scheme allows the water head to be moved left, right, forward or backward over the surface of the filter.

The water head 40 can also be adjusted in a vertical direction by manually loosening clamps 60, sliding the water head to the desired vertical position, and retightening the clamps.

The linear actuators 54 and 56 are controlled by one or more stepper motors (not shown) that allow precise movement of the actuators. The stepper motors are in turn controlled by a computer controller or processor disposed within the control panel 134 of FIG. 1.

To provide optimal cleaning, the controller moves the water head 40 over the top or upper surface of the filter in a spiral pattern, according to one embodiment of the invention. The speed of the movement, and the amount of overlap between successive spirals (i.e., an overlap distance) is determined by the controller in response to settings made by an operator on a controller user-interface.

In one embodiment the rinse water comprises deionized water to prevent recontamination of the filter with minerals and particles typically found in water supplies.

In one embodiment the rinse water is heated to a minimum of 20° F. above ambient temperature to nominally improve the cleaning effectiveness.

Rinsing and soaking station enclosure doors 70 and 72 (see in particular FIG. 1): Once the filter is moved into the soaking station 14 (rinsing station 24), the soaking station door 72 (rinsing station enclosure door 70) is closed to prevent water splashing outside the DPF cleaning machine 10 during the soaking (rinse) process.

In an alternate embodiment, an additional door (not shown) is positioned to separate the rinsing and soaking stations when closed. The door is hingeably attached to a rear surface of the cleaning machine 10 with a hinge, allowing the door to be closed to separate the rinsing and soaking stations.

Gray water tank 36 (see in particular FIGS. 2 and 3): Gravity drains the dirty soaking water and the rinse water into the gray water tank 36. One or more gray water level sensors 80 (see FIG. 5) are installed in the gray water tank to provide water tank level information to the computer controller or processor. In an alternative embodiment, the water tank 36 comprises a heating element to prevent the water from freezing.

Gray water pump 90 (see in particular FIG. 5): The pump 90 pumps water in the gray water tank through a gray water filter 92 (FIG. 1) into the clean water tank 20 (also FIG. 1). As the DPF is rinsed, the rinse water, also referred to as gray water, enters the gray water tank 36. The water/surfactant mixture also flows into the gray water tank after the soaking step.

Gray water filter 92 (see in particular FIG. 1): The filter 92 captures the soot and other contaminant particles that are, in one embodiment, less than about 5 microns in size. As the gray water tank fills, the gray water pump 90 pumps the gray water through the gray water filter 92 into the clean water tank 20. That is, the water that passes through the gray water filter 92 is recycled back into the clean water tank 20 for use during the next soaking and rinsing operations on another diesel filter.

Gray water flow meter 96 (see in particular FIG. 5): In one embodiment, a gray water flow meter 96 is mounted between the gray water filter 92 and the clean water tank 20. The flow meter is electrically connected to the computer controller for providing flow rate information. The gray water filter is considered to be clogged when the flow rate drops below approximately 80% (in one embodiment) of the flow rate for a new or clean gray water filter.

Clean water tank 20 (see in particular FIGS. 6 and 7): The clean water tank 20 supplies room temperature recycled water for both the soaking step and the rinsing step as described herein. Upper and lower water level sensors 100 are installed in the tank 20; one below a tank top and one above a water outlet connection 104 proximate the bottom of the tank 20. The level sensors 100 provide information to the computer controller to prevent a tank overflow and ensure there is adequate water available for cleaning filters. In an alternative embodiment, the clean water tank 20 contains a heating element that when activated prevents the water from freezing.

Figure 9:
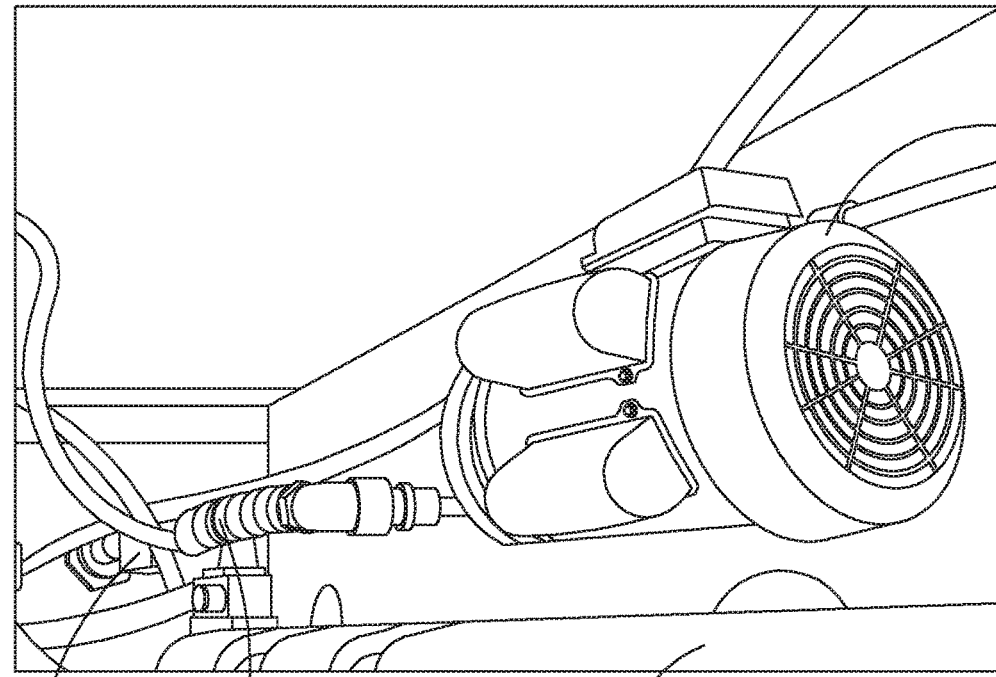
FIG. 9 illustrates plumbing components of the filter cleaning machine of FIG. 1.

Rinse pump 110 (see in particular FIG. 9): This pump 110 draws water from the clean water tank and directs it through a rinse pump hose 112 to the water head. The design of the pump limits the water pressure and thereby avoids over-pressurizing the rinse water and damaging the structure of the filter during the rinsing operation.

Rinse water flow control valve 120 (see in particular FIGS. 5 and 9): In one embodiment, this valve 120 is connected to the outlet of the rinse pump 110. The valve is electrically connected to the computer controller and variably opens or closes in response to a control signal from the computer controller. The valve is open nearly all the time, but begins to close when the gray water flow rate drops. Thus, the valve tends to maintain the clean water (i.e., rinse water) and gray water flow rates about the same as further described below.

Rinse water flow meter 124 (see in particular FIGS. 5 and 9): In one embodiment, a flow meter 124 is mounted between the rinse pump 110 and the water head 40 (see FIG. 4). The flow meter is electrically connected to the computer controller to provide flow rate information. Together with information from the gray water flow meter 96, the computer controller regulates the clean water supply using the rinse water flow control valve 120 so as to keep the gray and clean water flow rates balanced, especially as the gray water filter begins to fill and thereby choke off water flow. When the gray water supply is being slowed down by a full gray water filter 92, the rinse water flow valve 120 closes and thereby prevents depletion of the clean water supply, which would otherwise delay the DPF cleaning process.

Computer controller within the control panel 134 (see in particular FIG. 1): Operation of the cleaning machine 10 is controlled by a dedicated computer (also referred to herein as a controller, processor, or microcontroller). The computer is connected to the Internet and can be monitored and controlled remotely by an operator, such as a customer service employee. The computer is also connected to various components of the cleaning machine 10 for controlling operation of those components as described herein. Those connections can be made through wired or wireless elements, as known by those skilled in the art. The control panel 134 includes operator controls and machine status indicators for the filter cleaning machine 10.

The following additional elements of the filter cleaning machine are also shown in the various figures.

Rinse water inspection portal 140 (see in particular FIG. 3): In an alternate embodiment, the rinse water, after passing through the DPF, is automatically inspected for opacity or conductivity to determine if the rinse process has been completed and can therefore be terminated.

Generally, the opacity or conductivity of the rinse water is an indicator of the soot and contaminants that have been removed from the diesel filter. When the opacity or conductivity drops below a predetermined threshold the rinse operation is terminated. Opacity or conductivity is sampled continuously during the period which the rinse water inspection portal is full of water, and a running average of opacity or conductivity is calculated. This average is compared against the threshold for determining when the rinse procedure can be terminated.

Soaking station drain hole 144 (see in particular FIG. 3): In one embodiment the soaking station defines the drain hole 144 in the bottom surface of the soaking station 14. In another embodiment the bottom of the soaking station comprises a solid surface and the sealing mat 27, which seals the bottom surface of the filter. According to this embodiment the soaking water is poured from the filter, prior to moving the filter to the rinsing station by simply tilting the filter so that the soaking water flows into the drain gate 33 in the rinsing station.

Soak water pump and fill hose 146 (see in particular FIG. 3): The pump is not shown in any of the figures, but is generally located behind the gray water tank 36 in FIG. 3. This pump draws water from the clean water tank for use during the soaking process. The fill hose 146 allows the operator to direct the water from the pump into the top of the DPF in the soaking station 14.

Adapter hoses: For oblong or non-standard DPF sizes, the operator can attach hoses to the input and output of the DPF to allow soak or rinse water to run into the filter and exit to the drain in the respective soaking or rinsing station.

Operation of the Cleaning Machine

The general operation of the machine is as follows:

The operator places the diesel filter to be cleaned into the soaking station 14 of the machine 10. Advantageously the filter is oriented with its smooth rim against a bottom surface of the soaking station. The weight of the filter forms a seal with the sealing mat 27 or another material on a bottom surface of the soaking station.

The operator then fills the filter with a pre-mixed solution of water (from the clean water tank) and surfactant. The ratio of surfactant to water is dependent upon both concentration and the type of surfactant used. The amount of the solution required depends on the volume of the filter.

Once filled, the operator sets a timer indicating a soaking time interval. This interval depends on how dirty the filter is, the size of the filter, and the concentration of the soaking solution. Optimally, the soak time is between about 10 and 15 minutes.

Once the soaking time has elapsed or the operator visually determines the filter has soaked long enough, based on the appearance of floating particles in the soak water. The operator lifts the edge of the filter and the soak water (also referred to as gray water) drains from the filter. In one embodiment, the surface of the soaking station is elevated to allow the soak water to drain in a desired direction. Thus, the right side of the surface is elevated ½", causing the soaking water to flow the drain hole 144 (see FIG. 3) and then into the gray water tank 36. Absent the drain hole 144, the water drained from the filter flows down the elevated surface 25 into the drain grate 33 of the rinse station then into the gray water tank 36.

The operator then manually moves the filter into the rinsing station, and centers it in the area. A laser light source 103 (FIG. 8) is mounted in the rinse station and aligned with the water head 40 to project a cross pattern down onto the top surface of the DPF. This cross pattern assists the operator in correctly locating the filter in the center of the rinsing station.

Next, the operator loosens the water head clamps 60 to adjust the height of the water head. The clamps are loosened using a knob on each clamp. Optimally, the head is lowered to about ¼" to ½" inch above the top surface of the filter. Once the head height is adjusted correctly, the operator tightens the knobs on each clamp to retain the head at the desired height.

In an alternate implementation, the water head 40 is stationary and is affixed to the top of the filter using an interfacing sealing device, which spans the distance between the top surface of the DPF and the water head 40.

Since certain filters have an orientation notch to ensure it is installed correctly within the exhaust system, the sealing device of one embodiment covers the notch and thereby prevents water from escaping through the notch during the rinse operation. The sealing device is fitted around a segment of the filter circumference and may comprise a piece of tape, a strip of foam insulation or a curved (to match a curvature of the notch) piece of plastic.

Once the filter is positioned in the center of the rinsing station (as indicated by the laser light cross pattern) the operator closes and latches the machine doors to ensure that any splashed water stays within the rinsing station.

The operator then inputs the filter diameter to the computer controller through the control panel 134.

Next, the operator presses the start button on the control panel.

In response to the button push, the rinse pump is activated to draw water from the clean water tank 20 (see FIG. 1) and pump the water though a hose to the water head 40. Once water is flowing from the head, the computer controller directs the linear actuators 54 and 56 to move the water head in a spiral pattern over the surface of the filter, starting at the center of the filter. This spiral action delivers water of adequate pressure and volume, optimally 40 to 45 psi and 25 to 35 GPM. The optimal speed of the head is 2 inches per second.

This spiral movement of the water head is optimally calculated to move the head outward by the width of the head outlet or water spray pattern on each rotation. In one embodiment the water head outlet is about one inch in diameter.

During rinsing, water drains from the bottom of the filter, through the drain grate 33 of the rinsing station into the gray water tank 36.

When the head has reached the circumference of the filter, the computer controller turns off the rinse pump, moves the water head back to the center of the filter, and illuminates an indicator light on the control panel. This indicator signifies to the operator that the filter needs to be turned over.

The operator opens the machine door, loosens the clamps and manually raises the water head, flips the filter over, centers the filter under the water head again using the laser cross pattern, lowers the water head down to ¼" to ½" above the surface of the filter, closes the rinse station door and presses the start button again.

The computer controller then reactivates the rinse pump, and once water is flowing out of the head, the water head is moved in a spiral motion again over the surface of the filter. This spiral pattern is optimally calculated to move the head outward by half the width of the head outlet on each rotation.

When the water head reaches the circumference of the filter, the computer controller reverses the spiral pattern. This spiral pattern is optimally calculated to move the head inward by the width of the head outlet on each rotation.

When the water head reaches the center of the filter, the cleaning process is complete. The controller turns off the rinse pump and illuminates an indicator on the control box indicating the process is done.

In all cases, the rinse water stream is not augmented with high pressure air as this can damage the filter's internal structure.

It should be noted that the optimal rinsing is achieved by a combination of elements:
  (i) the water head delivers water perpendicular to the surface of the filter (to ensure the water is directed into the air channels of the DPF);
  (ii) the water pressure is a range of about 20 to 45 psi (to ensure sufficient force for penetrative rinsing without excessive back splash);
  (iii) the water flow rate is in a range of about 15 to 40 gpm (to ensure sufficient force for penetrative rinsing without excessive back splash and to ensure the rinse water does not back-up within the filter air channels),
  (iv) the water stream diameter in a range of about ½" to 2" (to ensure enough fluid is delivered for effective rinsing);
  (v) the water stream impacting the DPF from a height of about ⅛" to 1" above the surface of the filter (to ensure sufficient force for penetrative rinsing without excessive back splash); and
  (vi) the delivery of water to each air channel of the DPF for a minimum of about 1 second (to ensure enough fluid is delivered for effective rinsing).

At all times while the rinse pump is running, the computer controller monitors the flow of the rinse water and the flow of gray water. Both flows are measured using Hall effect flow meters 96 and 120 that are electrically connected to the computer controller. Other embodiments utilize other flow meter types.

As the gray water filter 92 (FIG. 1) traps the contaminants in the gray water and fills up, the water flow through a filtering membrane of the gray water filter 92 decreases. Consequently, the flow of water back into the clean water tank 20 decreases. This can cause a condition where the clean water tank runs dry during the rinse process, or alternatively, the gray water tank reaches its capacity.

Figure 5:
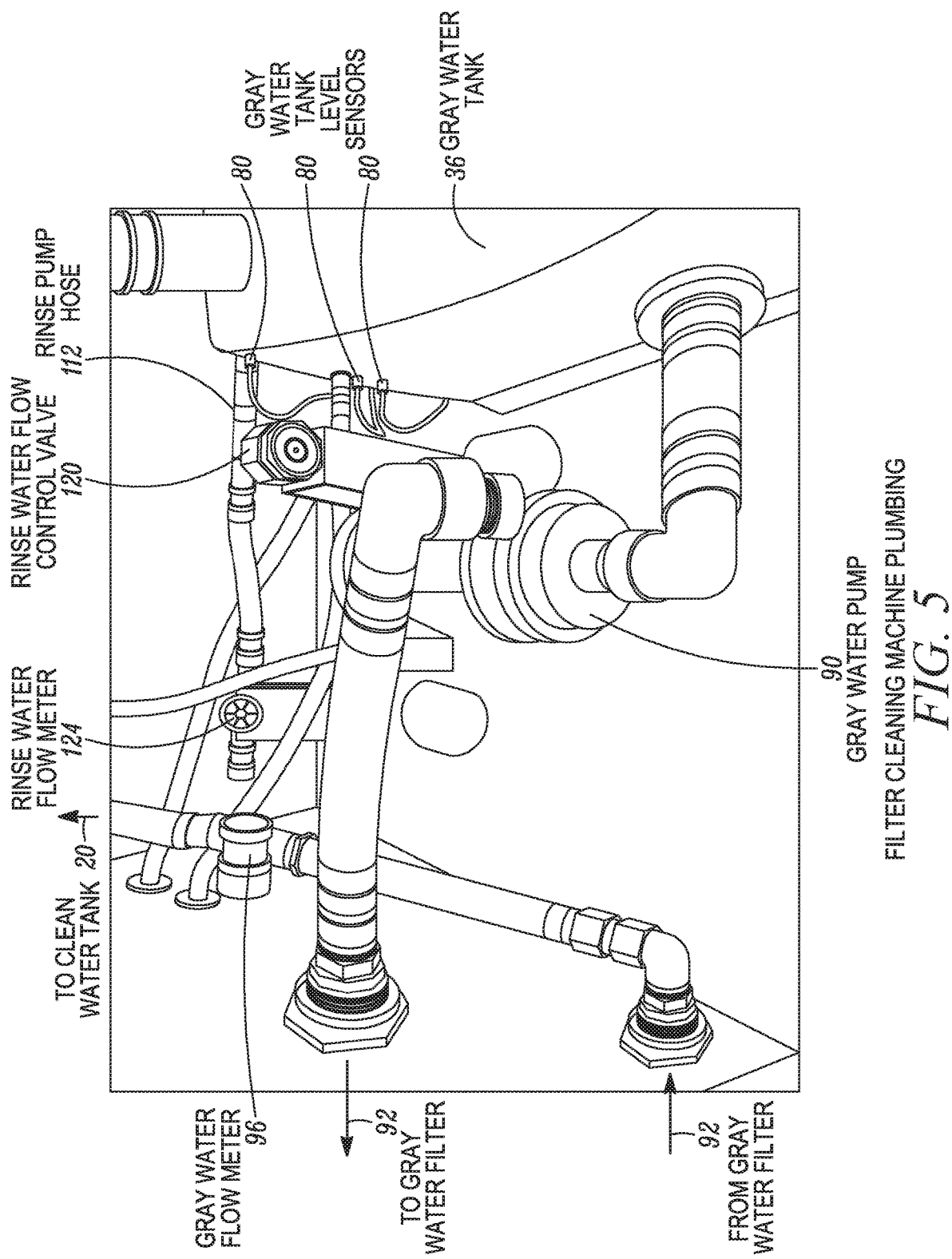
FIG. 5 illustrates plumbing components of the filter cleaning machine of FIG. 1.
Figure 6:
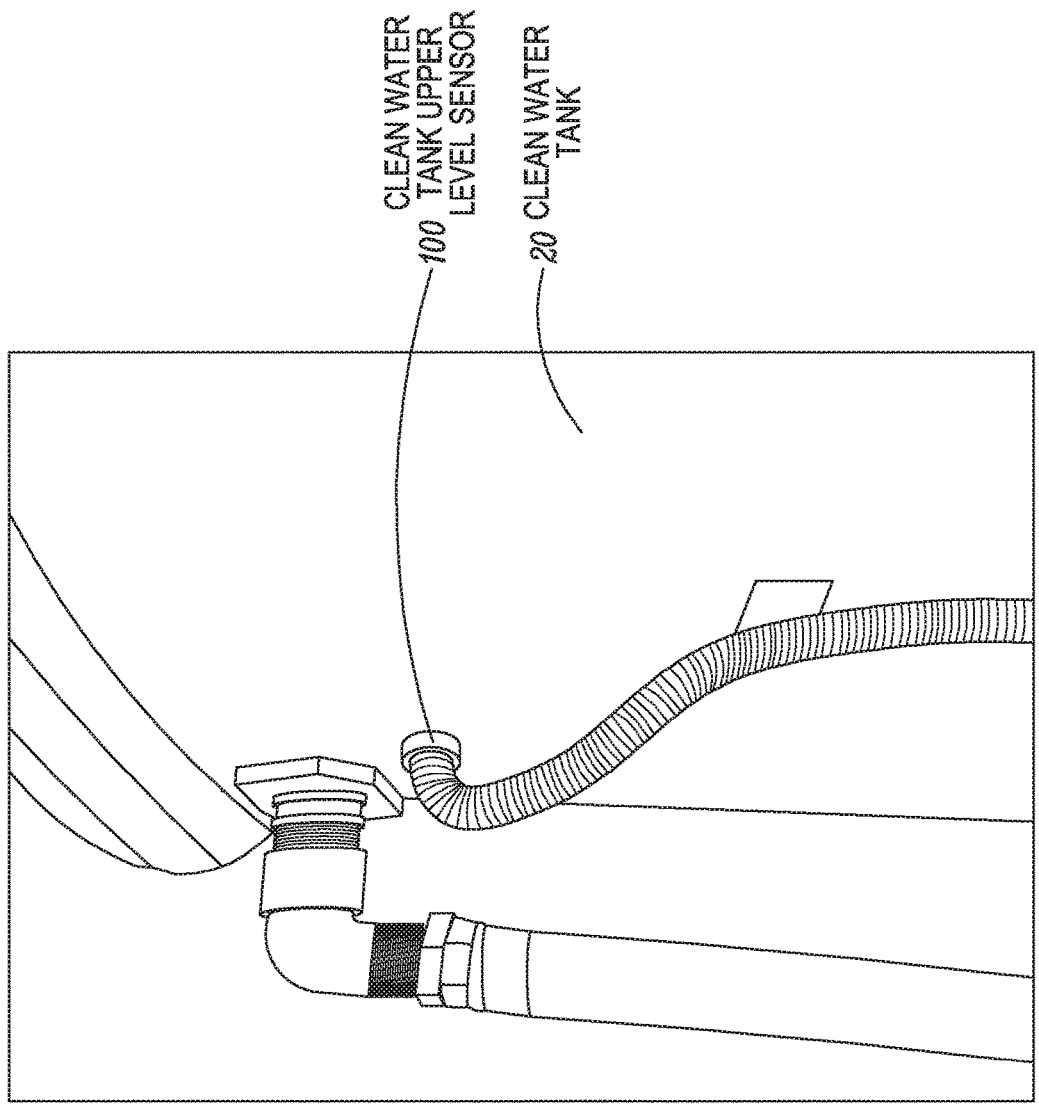
FIG. 6 illustrates a clean water tank level sensor of the filter cleaning machine of FIG. 1.
Figure 7:
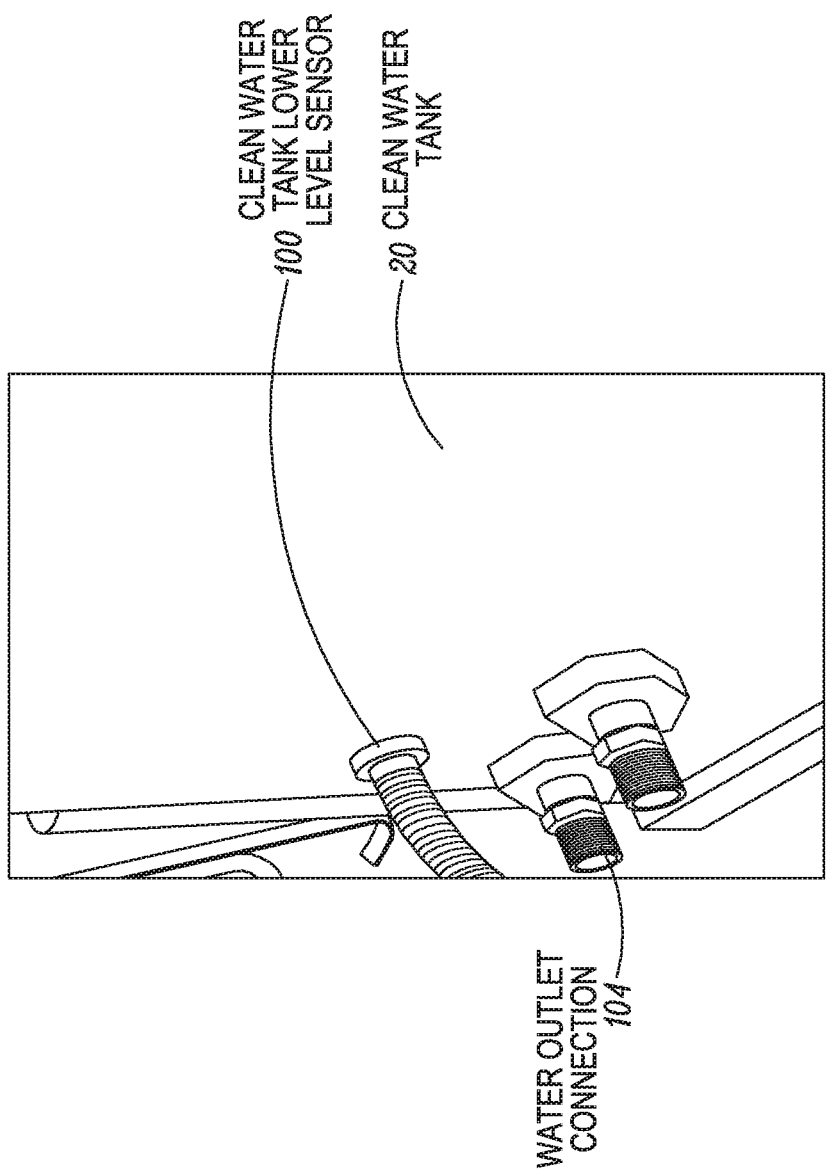
FIG. 7 illustrates a clean water tank lower level sensor of the filter cleaning machine of FIG. 1.
Figure 8:
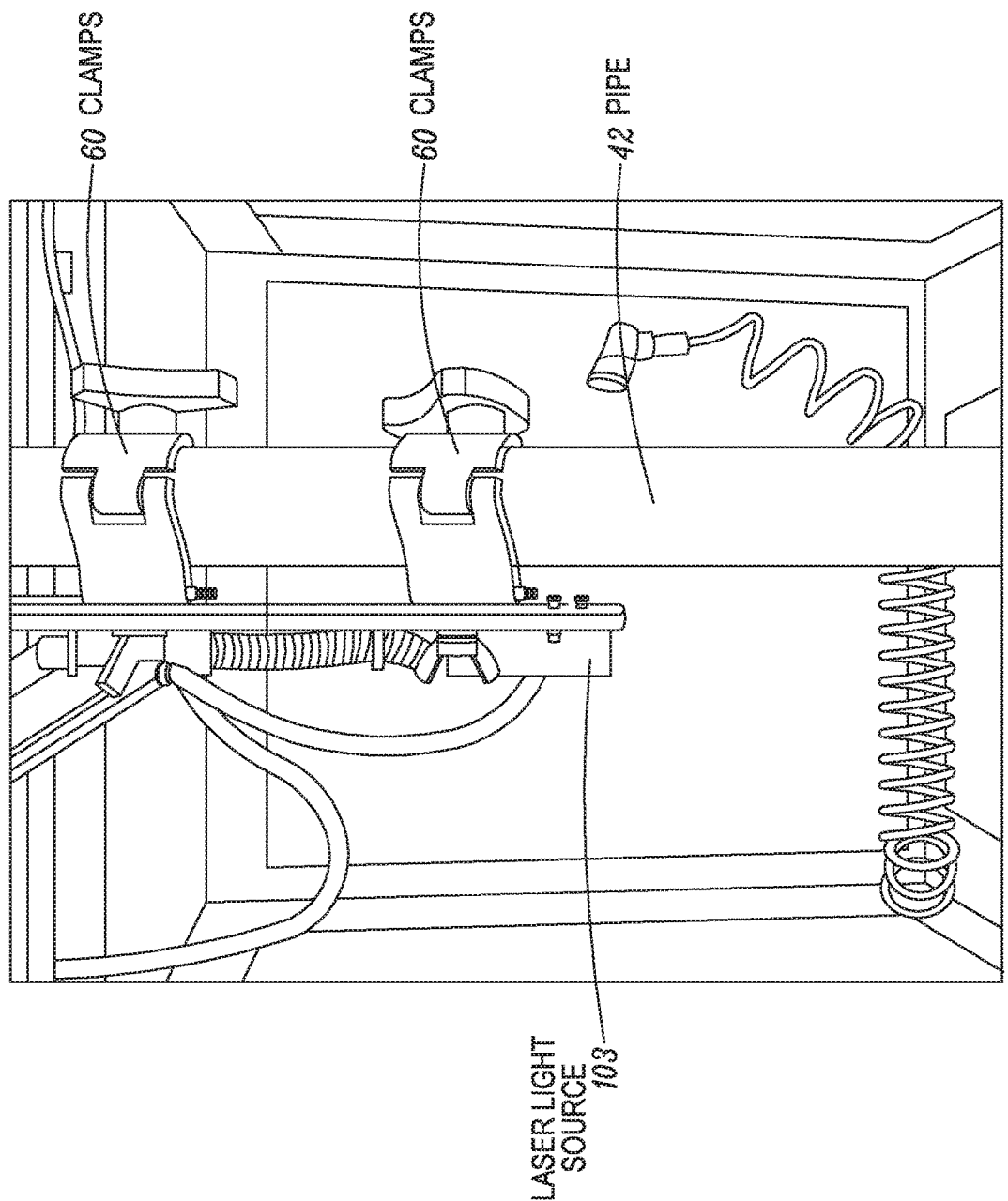
FIG. 8 illustrates a side view of a rinse station of the filter cleaning machine of FIG. 1.

To prevent these conditions, the computer controller continually monitors the rinse water and gray water levels. In one embodiment, this is done by the tank level sensors 80 and 10 (FIGS. 5, 6, and 7). When the highest-positioned gray water tank level sensor 80 is triggered, the computer controller stops the rinse and drain pumps, stops movement of the water head, and illuminates an indicator on the control panel indicating that the gray water filter 92 (FIG. 1) needs to be changed. That triggering action indicates that water is flowing into the gray water tank faster than the water is pumped from the gray water tank into the gray water filter. This output restriction is caused by a clogged or full (or a significantly restricted flow path) gray water filter.

In a different embodiment, the computer controller continually monitors flow rates using flow meters 96 and 124, and slowly closes the rinse water flow control valve 120 to keep the rinse water flow rate approximately equal to the gray water flow rate. If the rinse water flow rate drops to approximately 20 GPM, it has been empirically determined that there is not sufficient clean rinse water to adequately rinse the filter. At this point, the computer controller stops the rinse and drain pumps, stops movement of the water head, and illuminates an indicator on the control panel indicating that the gray water filter 92 needs to be changed.

After the filter is changed, the operator presses a button on the control panel 134 (FIG. 1) to advise the controller that the filter has been changed. In response to this button press, the computer controller resumes the rinsing process.

In an alternate embodiment, the computer controller can determine that the gray water filter is clogged from pressure sensor meters installed on the inlet and outlet sides of the gray water filter 92, i.e., indicating a pressure differential between inlet and outlet ports.

In an alternative embodiment without flow meters or pressure sensors, the rinse pump is turned on and off, optimally at 10 to 90 second intervals, to prevent the gray water tank from overflowing and allowing time for the gray water to pass through the gray water filter into the clean water tank.

The end of the rinse cycle can be determined:
(a) by a timer reaching a preset limit, or
(b) by electrodes disposed in the rinse water that are operated by the computer to determine a capacitance, an inductance or a conductivity of the rinse water, which will change as the amount of contaminant carried within the rinse water changes, or
(c) by a manual stop of the rinse process as commanded by the operator.

When the rinse operation is complete, the filter is removed by the operator and moved to area where the filter can be dried. Typically the DPF can be dried by blowing the water out from the filter with low pressure air, and then heating the DPF in a kiln at a low temperature (i.e., below the temperature of the exhaust gas) for about 45 minutes.

Other Embodiments, Features, and Operations of the Invention

It should be noted that a second filter can also be processed through the machine with the first filter. For example, the second filter can be in the soaking station while the first filter is undergoing the rinse operation.

As described above, the machine recirculates the soaking and rinse water to eliminate wasting water and to prevent releasing potentially hazardous contaminants removed from the DPF into the environment.

Although the diameter and height of diesel filters varies, the majority of filters are cylindrical with dimensions of about 18 inches in diameter by about 21 inches high. However, there are some filters that are conical, elongated or otherwise irregularly shaped. To clean these filters, the cleaning machine can be modified with extension hoses (described above as Adapter Hoses) that clamp on either end of the filter. The filter can then be laid horizontally across both the rinse and soak areas of the machine. In this scenario, the hinge in the rinse station enclosure door allows the door to close off the entire front of the machine.

The computer controller can also be programmed to move the water head in patterns other than a round spiral, including both random and non-random (i.e., determinative) patterns. Pattern control is also advantageous because certain diesel filters are not round in circumference and thus thorough cleaning/rinsing suggests a water head rinse pattern other than spiral.

The computer controller can also make optimal use of the cleaning time by focusing the action of the water head on areas of the filter that are particularly soot-laden, and spending less time on areas of the filter that are less dirty or at least prone to be less dirty. This can be accomplished by using a separate device which, prior to cleaning, measures the amount of airflow of the filter in small regions, optimally areas that are about 2500 square mm to about 40,000 square mm. This inspection device then builds an electronic map of the airflow rate over the entire surface of the filter. The areas with lower flow rates correspond to higher amounts of soot loading, and vice versa. This inspection device provides the electronic map through a wired or wireless connection to the computer controller on the cleaning machine. The computer controller can utilize this electronic map and adjust the speed and cleaning pattern of the water head to provide more or less cleaning where needed.

Because soot loading above 50% causes a decrease in fuel economy, it is also advantageous to clean the filter before reaching this point. It is possible to predict an estimated time when the filter should be cleaned by analyzing the vehicle type, engine type, dates of previous filter cleanings and the vehicle mileage on the cleaning dates.

The prediction is based on:
(a) the type of truck the filter is used in: heavy duty, multistep delivery, bus or refuse vehicle.
(b) the truck mileage when the dashboard light turns on reminding the driver that it's time to get the filter cleaned. Typically, the light turns on when the filter is about 80% full.
(c) the date of the filter cleaning
(d) optionally, the results of air flow testing of the filter before it is cleaned.

After only two or three filter cleanings, the time and mileage between filter cleanings is indicative of the approximate time from the last cleaning when the filter reaches 80% full. The 50% full point can then be estimated by knowing the truck type. This is possible because soot loading rate of the DPF is a fairly linear process over time, and generally each truck type has a different loading rate.

To predict filter cleaning times, the operator of the cleaning machine records the date and vehicle mileage when the filter is cleaned, along with the vehicle and engine type (if not already recorded). By recording this information electronically, for example via a web page user interface with an underlying database, a computer algorithm can calculate the estimated date for the next cleaning to ensure there is no reduction in fuel economy. Including the results of a filter flow rate scan in this analysis further improves the accuracy of the estimated cleaning date.

Figure 10:
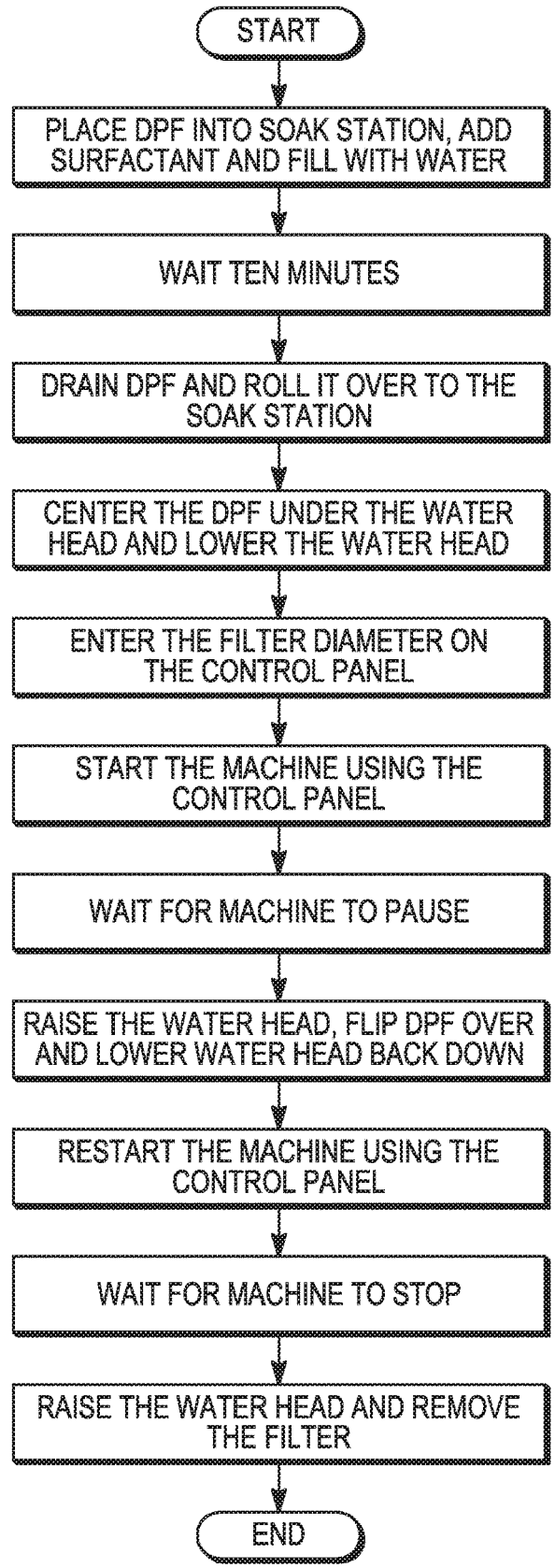
FIG. 10 illustrates an operational flow chart for the filter cleaning machine of FIG. 1.

FIG. 10 is a self-explanatory process flowchart depicting operation of the filter cleaning machine of the present invention.

What is claimed is:

1. A diesel particulate filter (DPF) cleaning machine comprising:
a soaking station wherein a soaking solution comprising water and a surfactant is supplied into a DPF, the soaking solution retained within the DPF during a soaking interval;
a rinsing station for receiving the DPF after the soaking interval;
a rinse water head positioned above an upper surface of the DPF for supplying rinse water into the DPF while the DPF is in the rinsing station, the rinse water passing through the DPF and draining from the DPF;
an actuator for moving the rinse water head in a predetermined pattern relative to the upper surface;
a gray water tank for receiving gray water from the rinsing station, the rinse water referred to as gray water after passing through and rinsing the DPF;
a gray water filter for receiving and filtering the gray water from the gray water tank, the gray water referred to as clean water after passing through the gray water filter, the clean water supplied to a clean water tank;
the clean water tank for supplying rinse water to the rinse water head;
a first level sensor for determining a level of gray water in the gray water tank;
a second level sensor for determining a level of clean water in the clean water tank;
a controller configured to control the flow of rinse water from the clean water tank to the rinse water head responsive to the gray water level and the clean water level; and
an indicator for issuing an indication to replace the gray water filter.

2. The diesel particulate filter (DPF) cleaning machine of claim 1 wherein a lower surface of the rinsing station is aligned with a lower surface of the soaking station to allow sliding of the DPF from the soaking station into the rinsing station.

3. The diesel particulate filter (DPF) cleaning machine of claim 1 further comprising a laser cross pattern display device for displaying a cross pattern on a surface of the DPF for aligning the rinse water head relative to the DPF.

4. The diesel particulate filter (DPF) cleaning machine of claim 1 wherein the rinse water head is connected to a clean water tank via a liquid supply conduit for carrying rinse water from the clean water tank to the rinse water head.

5. The diesel particulate filter (DPF) cleaning machine of claim 1 wherein the actuator moves the rinse water head according to a predetermined speed and cleaning pattern.

6. The diesel particulate filter (DPF) cleaning machine of claim 5 wherein a separate inspection device determines an airflow rate over a surface of the DPF thereby indicating DPF areas with lower and higher air flow rates, the speed and cleaning pattern responsive to DPF areas with lower and higher air flow rates.

7. The diesel particulate filter (DPF) cleaning machine of claim 1 wherein the actuator comprises perpendicularly oriented first and second actuators for moving the rinse water head along X and Y axes relative to the upper surface of the DPF.

8. The diesel particulate filter (DPF) cleaning machine of claim 7 wherein the first and second actuators move the rinse water head in a spiral pattern relative to the upper surface of the DPF.

9. The diesel particulate filter (DPF) cleaning machine of claim 8 wherein the first and second actuators move the rinse water head in a spiral pattern in a first direction and upon reaching a circumference of the DPF, the first and second actuators reverse the spiral pattern to a second direction.

10. The diesel particulate filter (DPF) cleaning machine of claim 9 wherein an actuator speed and an overlap distance between successive rings of the spiral pattern are controllable by the controller.

11. The diesel particulate filter (DPF) cleaning machine of claim 1 wherein the rinse water head is controlled to supply rinse water to the DPF according to a rinse pattern, the rinse pattern selected to ensure the rinse water flows through each channel of the DPF at least once, movement of the rinse water head controlled to execute the rinse pattern by the controller.

12. The diesel particulate filter (DPF) cleaning machine of claim 11, the rinse pattern originating at or near a center of the upper surface of the DPF, progressing linearly to a circumference of the DPF, and returning to the center while the DPF is angularly rotated.

13. The diesel particulate filter (DPF) cleaning machine of claim 1 where the rinse water is delivered perpendicularly to the upper surface of the DPF.

14. The diesel particulate filter (DPF) cleaning machine of claim 1 wherein parameters related to the supply of rinse water into the DPF comprise: the rinse water head delivering rinse water perpendicularly to the upper surface of the DPF, at a water pressure in a range of 20 to 45 psi, at a flow rate in a range of 15 to 40 gpm, a water stream diameter in a range of ½" to 2" and impacting the upper surface of the DPF from a height of ⅛" to 1" above the upper surface of the DPF, and rinse water supplied to each air channel of the DPF for a minimum of one second.

15. The diesel particulate filter (DPF) cleaning machine of claim 1 further comprising a vertical adjustment mechanism for moving the rinse water head vertically relative to the upper surface of the DPF.

16. The diesel particulate filter (DPF) cleaning machine of claim 1 wherein the rinse water is heated to a temperature above ambient temperature before supplying the rinse water to the rinse water head.

17. The diesel particulate filter (DPF) cleaning machine of claim 1 further comprising a rise water pump for supplying the rinse water to the rinse water head from the clean water tank.

18. The diesel particulate filter (DPF) cleaning machine of claim 17 further comprising one or more level sensors for determining a level of clean water in the clean water tank and for terminating the flow of rinse water responsive to the level.

19. The diesel particulate filter (DPF) cleaning machine of claim 17 further comprising the gray water tank for receiving the rinse water from a drain, one or more level sensors for determining a level of gray water in the gray water tank and for terminating the flow of rinse water responsive to the level.

20. The diesel particulate filter cleaning (DPF) machine of claim 1 further comprising:
a soaking station, the soaking solution supplied to the DPF when in the soaking station;
a drain disposed within a bottom surface of the rinsing station, the soaking solution caused to flow into the drain after soaking of the DPF in the soaking station, and the rinse water caused to flow into the drain after draining from the DPF.

21. The diesel particulate filter (DPF) cleaning machine of claim 1 the rinse water draining from the DPF into the gray water tank, a gray water pump for pumping the gray water from the gray water tank, through the gray water filter to a clean water tank, and further comprising a rinse water pump for supplying the rinse water to the rinse water head from the clean water tank.

22. The diesel particulate filter (DPF) cleaning machine of claim 21 further comprising a first flow meter for measuring flow from the clean water tank, a second flow meter for measuring flow into the gray water tank, and a valve for controlling flow from the clean water tank responsive to flow into the gray water tank.

23. The diesel particulate filter (DPF) cleaning machine of claim 21 further comprising a gray water flow meter disposed between the gray water filter and the clean water tank, a flow rate as determined by the flow meter indicative of a condition of the gray water filter.

24. The diesel particulate filter (DPF) cleaning machine of claim 21 further comprising a controller for controlling on and off intervals of the rinse water pump responsive to a condition of the gray water, or to a level of the gray water in the gray water tank, or to a flow rate of gray water into the gray water tank, or to a flow rate of gray water out of the gray water pump.

25. The diesel particulate filter (DPF) cleaning machine of claim 1 further comprising electrodes disposed in the rinse water for determining a capacitance, an inductance or a conductivity of the rinse water after rinsing of the filter, for terminating the rinse operation responsive to the capacitance, inductance or conductivity of the rinse water.

26. The diesel particulate filter DPF cleaning machine of claim 1 further comprising a rinse water inspection portal, the supplying of rinse water into the DPF responsive to a condition of the rinse water as determined from the inspection portal.

27. A diesel particulate filter (DPF) cleaning machine comprising:
- a soaking station in which a soaking solution comprising water and a surfactant is placed in a DPF, the soaking solution retained within the DPF during a soaking interval;
- a rinse water head positioned above an upper surface of the DPF and moved relative to the upper surface, the rinse water head for supplying rinse water into the DPF after the soaking interval, the rinse water passing through the DPF and draining from the DPF;
- a rinse water valve for controlling a flow of rinse water to the rinse water head;
- a clean water tank for receiving clean water from a clean water source and for supplying rinse water to the rinse water head; and
- a controller configured to control the rinse water valve responsive to one or more of a clean water level in the clean water tank, a clean water flow rate into the clean water tank, and a rinse rate flow rate out from the clean water tank.

28. The diesel particulate filter (DPF) cleaning machine of claim 27 wherein the soaking interval is dependent on an amount of particulate material in the DPF.

29. The diesel particulate filter (DPF) cleaning machine of claim 27, wherein the rinse water is referred to as gray water upon draining from the DPF, the DPF cleaning machine further comprising:
- a gray water tank for receiving the gray water after rinsing the DPF;
- a gray water filter for receiving and filtering the gray water from the gray water tank to produce the clean water and for supplying the clean water to the clean water tank, the clean water source comprising the gray water filter; and
- first and second pressure sensors for determining a pressure differential across the gray water filter, the controller responsive to the pressure differential and configured to set an indicator when the pressure differential exceeds a predetermined value.

30. A diesel particulate filter (DPF) cleaning machine comprising:
- a soaking station in which a soaking solution comprising water and a surfactant is applied to a DPF, the soaking solution retained within the DPF during a soaking interval;
- a rinse water head positioned above and perpendicular to an upper surface of the DPF for supplying rinse water into the DPF after the soaking interval, the rinse water passing through the DPF and draining from the DPF as gray water;
- a gray water tank for capturing the gray water;
- a gray water filter for receiving the gray water from the gray water tank and for filtering the gray water to produce clean water;
- a clean water tank for receiving the clean water;
- a rinse water valve for controlling a flow of clean water from the clean water tank to the rinse water head; and
- a controller configured to monitor at least one of a level of clean water in the clean water tank, a rate of clean water flow into the clean water tank, and a rate of clean water flow out from the clean water tank, and configured to control the rinse water valve responsive to one or more of the level of clean water in the clean water tank, the rate of clean water flow into the clean water tank, and the rate of clean water flow out from the clean water tank.

31. The diesel particulate filter (DPF) of claim 30 further comprising a rinsing station for receiving the DPF after the soaking interval, the rinse water head for supplying rinse water into the DPF when the DPF is within the rinsing station.

32. The diesel particulate filter (DPF) cleaning machine of claim 30 wherein the soaking interval is dependent on an amount of particulate material in the DPF.

* * * * *